Aug. 3, 1965     F. J. MARGIDA     3,198,203
SAFETY VALVE FOR HYDRAULIC BRAKING SYSTEM
Filed Dec. 26, 1962     2 Sheets-Sheet 1
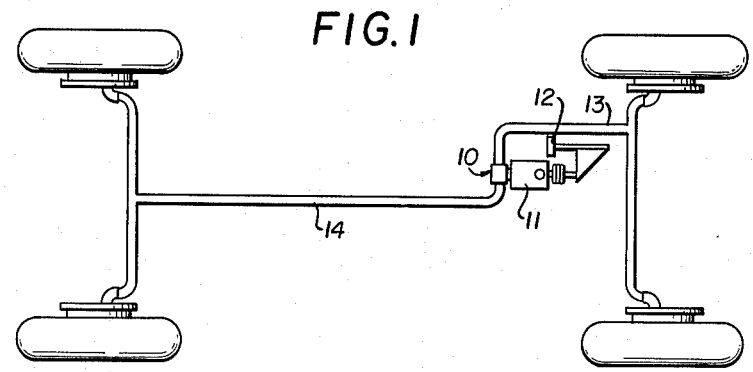
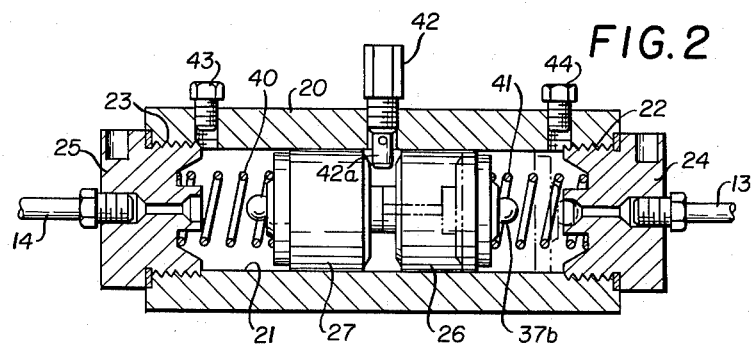
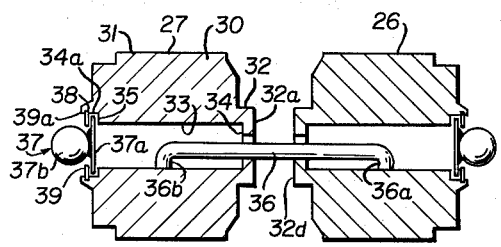
INVENTOR.
FRANK J. MARGIDA
BY
ATTORNEY

INVENTOR.
FRANK J. MARGIDA

BY

ATTORNEY

United States Patent Office 3,198,203
Patented Aug. 3, 1965

3,198,203
SAFETY VALVE FOR HYDRAULIC
BRAKING SYSTEM
Frank J. Margida, Cuyahoga Falls, Ohio, assignor to Saf-T-Brake Valve Co., Inc., Cuyahoga Falls, Ohio, a corporation of Ohio
Filed Dec. 26, 1962, Ser. No. 246,984
1 Claim. (Cl. 137—118)

This invention relates to the art of hydraulic brake systems for automobiles or trucks and in particular has reference to safety mechanisms for use with such hydraulic brake systems to obviate the loss of braking fluid in the event of rupture in either the front or rear line of the vehicle.

The state of the art to which this improvement is directed is best shown in applicant's prior Patent No. 2,960,-102 issued November 15, 1960. In essence, the above patent of the applicant teaches the introduction of braking fluid to the central portion of the elongated chamber that is provided in the safety device with the braking fluid entering between the pair of opposed pistons so as to spread the same apart in unison. In the event of failure, there will be an absence of existing pressure behind one such piston with the result that the same will be immediately shifted into sealing contact to close off the ruptured line and thus avoid further loss of braking fluid.

While the aforementioned patent has enjoyed considerable commercial success, it has nonetheless been found that the same can be improved in several objectives.

Specifically, it has been found difficult to hold the machining tolerances that build up in connection with the manufacturing of the components of the device and particular difficulty has been encountered in this regard with reference to insuring that the closure element of the device will properly seat with respect to the port opening that is to be sealed off in the event of failure in either line.

In this regard, it has been discovered that if a floating ball is employed in connection with a rigidly disposed piston, then and in that event, the full sealing off will occur in each instance of failure.

It has further been discovered that if the means of connection the pistons together and limiting axial separation therebetween are simplified, that improved results will occur due to the greater ease of manufacture as well as greater ease in installing and assembling units of this type.

It has further been discovered that improvement can be achieved with reference to the above discussed patent by varying the amount of fluid displaced by each specific brake line so that in the instance of a passenger car, for example, a greater amount of fluid can be displaced to the larger pistons provided on the front wheels, while in the instance of use of the device in connection with the truck installations, the device can be secured in position with reference to the master cylinder so as to supply a greater amount of fluid to the normally larger pistons that are provided on the rear wheels of trucks.

Production of an improved brake type safety valve having the above advantages accordingly becomes the principle object of this invention with other objects thereof becoming more apparent upon a reading of the following brief specification, considered and interpreted in the light of the accompanying drawings:

Of the drawings:

FIGURE 1 is a schematic view showing the improved safety device schematically connected to the hydraulic brake system of an automobile.

FIGURE 2 is a vertical section taken through the improved safety device and showing the actuating piston in elevation and illustrating the position thereof in full and chain-dotted lines.

FIGURE 3 is a sectional view of the improved pistons showing the manner of interconnection between the same and further illustrating the floating concept of the sealing ball provided on each piston.

Figure 4:
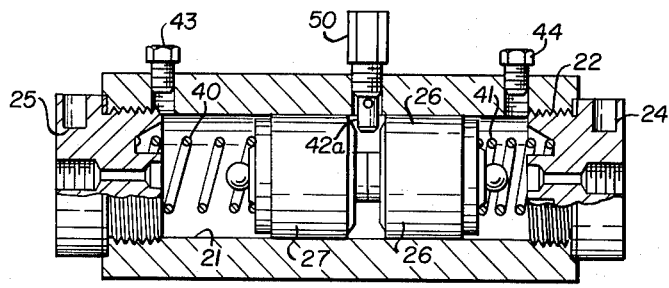
FIGURE 4 is a sectional view similar to FIGURE 2 but showing a modified form of the invention.

Referring now to the drawings and in particular to FIGURE 1, the improved safety valve, generally designated by the numeral 10, is shown operably associated with a master cylinder 11 of the hydraulic braking system, with fluid in the master cylinder 11 being directed into the safety device 10 upon the application of braking pressure through the conventional pedal 12, and with fluid emitting from the safety device 10 to operate a front brake line 13 and a rear brake line 14.

Turning now to FIGURE 2 for a detailed description of the improved safety valve 10, it will be noted that the same is of generally circular elongated configuration so as to include a central body portion 20, having a bore 21 that is threaded at its opposed ends, as at 22 and 23, for the reception of fittings, 24 and 25 that respectively dispense braking fluid to the front line 13 and the rear line 14, with the just described fittings being appropriately threaded so as to be received in the threaded ends 22 and 23 as is apparent from FIGURE 2 of the drawings.

A pair of opposed actuating pistons 26 and 27 are receivable in the bore 21 and are shown best in FIGURE 3 of the drawings where the same are illustrated in section, with the elevational position of these pistons 26 and 27 being shown in FIGURE 2. In this regard, the pistons 26 and 27 are of identical configuration in FIGURES 2, 3, 4 and 7, and accordingly a detailed description of only the piston 27 will be undertaken with it being understood that the remaining piston 26 is identically constructed with the same being arranged in opposite hand relationship as shown in FIGURES 2 and 3 of the drawings.

Accordingly and referring to FIGURE 3, the piston 27 is shown as having a central body portion 30 the peripheral surface 31 of which corresponds substantially to the diameter of the bore 21 so that the piston may be freely reciprocated in the bore 21 as will be apparent in greater detail in the ensuing paragraphs.

Additionally, the body portion 30 is provided with a cylindrical end 32 that has a face 32a that will normally engage the equivalent face 32d of the remaining piston 26 with this condition being shown in the full line position of FIGURE 2.

The piston 27 further includes a central bore 33 that terminates in a shoulder 34 at one end thereof, with the opposite end thereof terminating in a counterbore 34a. An opening 35 is provided in end wall 32 so that a connecting rod 36 may be inserted therein as shown in FIGURE 3 of the drawings. The counterbore 34a further defines a seat 35 against which may be seated the sealing unit 37 that is preferably integrally secured thereto. A second counterbore 38 is provided for the purpose of seating a retaining ring 39 with the retaining ring 39 being staked in place by staking portions of the edges in place over ring 39 as indicated by the numeral 39a in FIGURE 3 of the drawings. In this fashion, it will be noted that the sealing unit 37 is loosely positioned with respect to the piston so that the same can float to a limited extent either axially or radially to thus insure firm seating over the port opening that is operably associated therewith.

For the purpose of connecting the pistons in operable association, while limiting axial separation therebetween, the rod 36 has its ends 36a and 36b bent over at preferably right angles so that the same will engage between the shoulders 34, 34 to thus limit the degree of separation that can occur in any one instance.

Turning now to the remaining components of the unit 10, the just described pistons 26 and 27 are normally retained in the abutting position shown in full lines in FIGURE 2 by the use of springs 40 and 41, with the fitting 42 that connects to the master cylinder preferably having an end 42a that projects into the cylinder so as to prevent movement of either piston out of its normal area.

Thus and as shown from FIG. 2, the piston 27 could not move to the right of center while the piston 26 could similarly not move to the left of the center due to the interference with the projecting end 42a. Auxiliary fittings 43 and 44 are provided for the purpose of bleeding air from the valve.

In use or operation of the improved safety device, it will first be assumed that the component parts have been assembled to the position shown in FIGURES 2 and 3 of the drawings, and that the unit 10 has been properly secured with respect to the front and rear brake lines as well as the master cylinder.

At this time, the application of braking pressure will cause the fluid in the master cylinder to be directed under pressure to the interior of the valve 10 with such fluid entering through the projecting end 42a of the fitting 42. Fluid so entering will spread the pistons 26 and 27 apart in unison and the movement of the pistons will accordingly result in transmittal of braking pressure to the front and rear brake lines. When the braking pressure is relieved, the springs 40 and 41 will return the pistons 26 and 27 to the full line position of FIGURE 2.

It will be noted in this regard that the length of the connecting rod 36 is such that the pistons cannot spread apart sufficiently enough in the normal instance to simultaneously engage both of the port openings.

However, in the event of failure in the line 13 for example, there will be a complete absence of existing pressure to the right of the piston 26 and accordingly the same will move rapidly to the right under the influence of the fluid entering from fitting 42 and the sealing ball 37b will thus be shifted to the chain dotted position of FIGURE 2 to seal off the port opening that is provided in the fitting 24. In this regard, it will be noted that the floating concept of the ball member permits the same to adjust itself to perfect seating relationship over the opening to be closed off. At this time, the force of the return spring 41 will be insufficient to unseat the ball 37b of piston 26 and accordingly the line 13 will not receive any additional fluid that would merely be discharged through the rupture in the same. During the period the piston 26 is seated in closing position with respect to line 13, normal functioning of the remaining line 14 will occur so that braking pressure is nonetheless obtained in the rear wheels.

To repair the rupture in the line 13, the line 13 need merely be removed from cap 24 and a rod be inserted through the opening therein to unseat the ball 37b.

With reference to the modified form of the invention shown in FIGURES 4 through 7 of the drawings, it has been previously indicated that these modifications are intended to supply varying amounts of fluid to the front and rear lines upon the application of braking pressure to the pedal 13.

Accordingly, in FIGURE 4, the fitting 50 from the master cylinder is shown disposed to the right of the center line. Thus, the piston 26 will displace a lesser amount of fluid than the piston 27, with the result that a lesser amount of fluid is delivered to the line 13 than is delivered in the line 14 in the modification of FIGURE 4.

Figure 5:
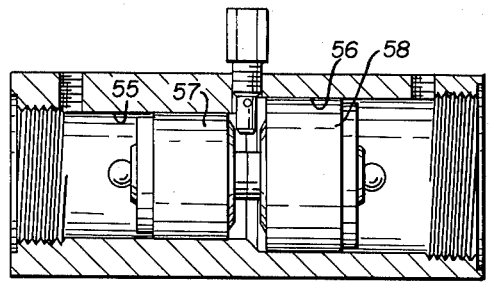
FIGURES 5 and 7 are similar sectional views of a still further modification of the invention.

In the modification of FIGURE 5, the bore 21 of FIGURES 1 through 4 is replaced by two bores 55 and 56, with the bore 56 being of a larger diameter and with a larger piston being received therein so as to displace a greater amount of fluid to the line connected with the bore 56 in this instance. In this regard, the pistons 57 and 58 are constructed as previously described in connection with FIGURES 1 to 3 with the piston 58 being different only in its diameter dimension so as to be properly reciprocal within the bore 56.

Figure 6:
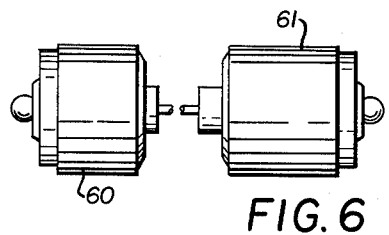
FIGURE 6 is an elevational view of the modified form of pistons that can be used in connection with the apparatus of FIGURES 1 through 3.

In the modification of the invention shown in FIGURE 6, the pistons 60 and 61, while constructed identically, are of different axial lengths so that the amount of travel that could be achieved by the piston 60 would be greater than the amount of travel that would be achieved by the piston 61. Accordingly, a greater amount of fluid would be displaced by piston 60 upon insertion of the same into the body member 20 shown in FIGURES 1 through 3 of the drawings.

Figure 7:
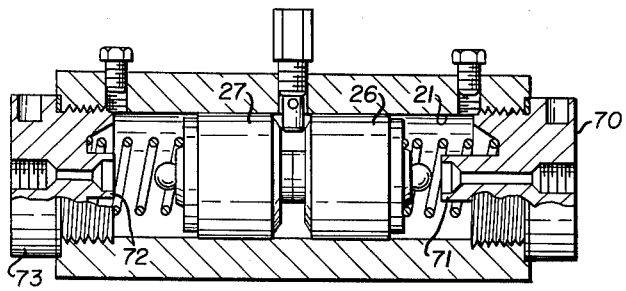

With reference to FIGURE 7, the only difference of construction relates to the construction of the fitting members that are provided in the opposed ends of the bore 21.

Accordingly, the fitting 70 has a boss 71 that projects into the bore 21 to a greater extent than does the boss 72 of the fitting 73. Accordingly, the piston 26 would displace a lesser amount of fluid than would the piston 27.

It will be seen from the foregoing, how there has been provided a new and improved type of safety brake device that is characterized by the improved sealing arrangement together with an improved type of connection between the opposed pistons that control the operation of the device. It has been further shown how the improved device lends to adaption with modified types of body members per se with the result that variation in piston diameters or bore diameters can be used to effectuate delivery of varying amounts of braking fluid to the respective braking lines involved.

While a full and complete description of the invention has been set forth in accordance with the dictates of the patent statutes, it is to be understood that the invention is not intended to be limited to the specific embodiment herein shown.

Accordingly, modifications of the invention may be resorted to without departing from the spirit hereof or the scope of the appended claim.

What is claimed is:

A control valve for controlling hydraulic flow between the master cylinder and the front and rear brake lines of an automotive vehicle, comprising;

(A) a valve body having
   (1) a main axial passage therethrough defined by port openings provided adjacent the opposed axial ends thereof,
   (2) a second auxiliary passage
      (a) interconnecting said main passage adjacent the central portion thereof;

(B) a pair of concentric piston heads
   (1) receive in said main axial passage in axially shiftable relationship therewith;

(C) a pair of valve plugs
   (1) supported by said piston heads in radially and axially shiftable relationship therewith,
   (2) projecting axially from said heads toward said port openings,
   (3) and being shiftable into seating engagement with said port opening adjacent thereto upon movement of said piston head into adjacency with said port opening;

(D) at least one piston rod
   (1) interconnecting said piston heads and (2) permitting relative axial movement between said pistons while retaining the same in concentricity with each other;
(E) and displacement control means
(1) defined by said main axial passage and said piston heads and
(2) independently displacing different volumes of braking fluid to said front and rear brake lines upon separation of said pistons in response to equal pressures introduced through said second auxiliary passage.

References Cited by the Examiner
UNITED STATES PATENTS

| | | | |
|---|---|---|---|
| 2,098,653 | 11/37 | Carroll | 60—54.6 |
| 2,408,799 | 10/46 | Melicher | 251—84 |
| 2,960,102 | 11/60 | Margida | 137—119 |
| 3,001,545 | 9/61 | Ziege | 251—86 XR |

M. CARY NELSON, *Primary Examiner.*

MARTIN P. SCHWADRON, *Examiner.*